US006782454B1

(12) United States Patent
Damron

(10) Patent No.: US 6,782,454 B1
(45) Date of Patent: Aug. 24, 2004

(54) SYSTEM AND METHOD FOR PRE-FETCHING FOR POINTER LINKED DATA STRUCTURES

(75) Inventor: Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 502 days.

(21) Appl. No.: 09/677,090

(22) Filed: Sep. 29, 2000

(51) Int. Cl.[7] .............................................. G06F 12/00

(52) U.S. Cl. ...................................... 711/137; 712/237

(58) Field of Search .......................... 711/137; 212/237

(56) References Cited

U.S. PATENT DOCUMENTS 5,652,858 A 7/1997 Okada et al. ............... 395/464
5,890,212 A 3/1999 Sokolov et al. ............. 711/113

FOREIGN PATENT DOCUMENTS

EP 0 723 221 A2 7/1996

OTHER PUBLICATIONS

Roth et al. "Effective Jump–Pointer prefetching for Linked Data Structures," IEEE Proceedings of the 26th International Symposium on Computer Architecture, May 2–4, 1999.*

Magnus Karlsson et al. , "A Prefetching Technique for Irregular Accesses to Linked Data Structures". High–Performance Computer Architecture, 2000. HPCA–6. Proceedings. Sixth International Symposium on Touluse, France. Jan. 8, 2000, pp. 206–217. Los Alamitos, California, USA.

* cited by examiner

*Primary Examiner*—Jack A. Lane
*Assistant Examiner*—Paul Baker
(74) *Attorney, Agent, or Firm*—Martine & Penilla, LLP

(57) ABSTRACT

A system and method are provided for efficiently prefetching data in a pointer linked data structure (140). In one embodiment, a data processing system (100) is provided including a processor (110) capable of executing a program, a main-memory (115) and a prefetch engine (175) configured to prefetch data from a plurality of locations in main-memory in response to a prefetch request from the processor. When the data in main-memory (115) has a linked-data-structure having a number nodes (145) each with data (150) stored therein, prefetch engine (175) is configured to traverse the linked-data-structure and prefetch data from the nodes. The prefetch engine (175) is configured to determine from data contained in a prefetched first node (145A) and an offset value a new starting address for a second node (145B) to be prefetched. In one embodiment, the prefetch engine (175) includes a number of sets of prefetch registers (180), one set of prefetch registers for each prefetch request from processor (110) that is yet to be completed. Each set of prefetch registers (180) includes (i) a prefetch address register (190); (ii) an offset register (195); (iii) a termination register (200); (iv) a status register (205); and (v) a returned data register (210).

17 Claims, 2 Drawing Sheets

SYSTEM AND METHOD FOR PRE-FETCHING FOR POINTER LINKED DATA STRUCTURES

FIELD

The present invention relates generally to information and data storage communication and management, and more particularly to a system and method for prefetching data stored in a pointer linked data structure.

BACKGROUND

Modem computer systems generally include a central processing unit (CPU) or processor for processing data and a memory system for storing operating instructions and data. Typically, the speed at which the processor is able to decode and execute instructions exceeds the speed at which instructions and data are transferred between the memory system and the processor. Thus, the processor is often forced to wait for the memory system to respond. This delay is commonly known as memory latency. To reduce, if not eliminate, this time many computer systems now include a faster memory known as a cache memory between the processor and main-memory.

A cache memory reduces the memory latency period by temporarily storing a small subset of data from a lower-level memory such as a main-memory or mass-storage-device. When the processor needs information for an application, it first checks the cache. If the information is found in the cache (known as a cache-hit), the information will be retrieved from the cache and execution of the application will resume. If the information is not found in the cache (known as a cache-miss) then the processor will proceed to access the lower-level memories. Information accessed in the lower-level memories is simultaneously stored or written to the cache so that should the information be required again in the near future it is obtained directly from the cache, thereby reducing or eliminating any memory latency on subsequent read operations.

Use of a cache also reduces the memory latency period during write operations by writing to the cache. This reduces memory latency in two ways. First, it enables the processor to write at the much greater speed of the cache, and second, storing or loading the data into enables it to be obtained directly from the cache should the processor need the data again in the near future.

Caches rely on principles of temporal and spacial-locality to speed up memory access operations. These principles of locality are based on the assumption that, in general, a computer program accesses only a relatively small portion of the information available in computer memory in a given period of time. In particular, temporal locality holds that if some information is accessed once, it is likely to be accessed again soon, and spatial locality holds that if one memory location is accessed then other nearby memory locations are also likely to be accessed. Thus, in order to exploit temporal-locality, caches temporarily store information from a lower-level memory the first time it is accessed so that if it is accessed again soon it need not be retrieved from the lower-level memory. To exploit spatial-locality, caches transfer several blocks of data from contiguous addresses in lower-level memory, besides the requested block of data, each time data is written to the cache from lower-level memory.

Another method of reducing memory latency is commonly known as prefetching. Prefetching involves identifying memory access operations likely to result in a cache-miss and generating and executing prefetch instructions to store data from main-memory into the cache in advance of the time when they will actually be needed by the processor. Various approaches and mechanisms have been tried in an attempt to predict the processor's need ahead of time. One simple approach exploits the principle of spatial locality by prefetching a block of data immediately following that last referenced by the processor.

While a significant improvement over cache systems without prefetching all of the prior art prefetching mechanisms suffer from a common short coming. All prior art prefetching mechanisms are embedded in the hardware or firmware of the cache controller and provide no accommodating characteristics for the program being executed or the data structure, but rather retrieve a set amount of data from a set range in memory. Thus, while conventional prefetching mechanisms may work well in prefetching data stored sequentially, such as in an array where elements are stored in contiguous portions of memory, they do not work with pointer linked data structures, such as lists or trees. Pointer linked data structures consist of a number of nodes each containing data and a link which is an address of the next node. Typically, the individual nodes are allocated separately and are widely scattered throughout main-memory. Therefore, there is a need for a system and method for prefetching data in a pointer linked data structure.

SUMMARY

The present invention provides a system and method for efficiently prefetching data in a pointer linked data structure.

In one aspect, the present invention provides a data processing system including a processor capable of executing a program, a main-memory and a prefetch engine configured to prefetch data from a plurality of locations in main-memory in response to a prefetch request from the processor. When the data in the main-memory has a linked-data-structure having a plurality of nodes each with data stored therein, the prefetch engine is configured to traverse the linked-data-structure and prefetch data from the nodes. Generally, the prefetch request includes a starting address of a first node to be prefetched, an offset value, and a termination value. The prefetch engine is configured to determine from data contained in a prefetched first node at the offset value from the address of the first node, an address for a second node to be prefetched.

In one embodiment the termination value is, for example, an end address, and the prefetch engine is configured to compare the address of the last node to be prefetched to the termination value to determine whether the prefetch request has been satisfied. Alternatively, where the termination value is a number of nodes to be prefetched, the prefetch engine is configured to count the number of nodes prefetched as they are prefetched and to compare the number of nodes prefetched to the termination value.

In another embodiment, the prefetch engine includes a number of sets of prefetch registers, one set of prefetch registers for each prefetch request from the processor that is yet to be completed. Each set of prefetch registers includes (i) a prefetch address register; (ii) an offset register; (iii) a termination register; (iv) a status register; and (v) a returned data register.

In yet another embodiment, the data processing system includes a cache capable of storing data transferred between the processor and a main-memory, and the prefetch engine is configured to write the prefetched data from the node to the cache. In one version of this embodiment, the data processing system further includes a cache controller configured to store data in the cache, and the prefetch engine is configured to issue a prefetch instruction to the cache controller.

In another aspect, the present invention is directed to a method of prefetching data in a data processing system having a pointer linked data structure with a number of nodes, each with data stored therein. In the method, a prefetch request from a processor is received in a prefetch engine, the prefetch request including a starting address of a node, an offset value and a termination value. Data in the node is prefetched. It is determined whether a termination condition has been met and the prefetch request satisfied. If not, the offset and the starting address are used to load a new starting address from the prefetched data. That is the address indicated by the sum of the starting address and the offset holds the new starting address for the next node to be prefetched. The process is repeated until the termination condition is met.

In one embodiment, the termination value is an end address, in which case the step of determining whether the termination condition has been met involves comparing the address of the last node from which data was prefetched to the termination value. Alternatively, the termination value is a predetermined number of nodes to be prefetched, the step of determining whether the termination condition has been satisfied includes the steps of (i) counting the number of nodes prefetched, and (ii) comparing the number of nodes prefetched to the termination value.

In another embodiment, the step of prefetching data in the node involves recording data from the node in a register in the prefetch engine. Alternatively, when the data processing system includes a cache capable of storing data transferred between the processor and a main-memory, the step of prefetching data involves writing data from the node to the cache. Where the data processing system further includes a cache controller configured to store data in the cache, the step of prefetching data is accomplished by issuing a prefetch instruction to the cache controller.

In yet another aspect, the invention is directed to a data processing system including a processor, a main-memory having a linked-data-structure with a plurality nodes with data stored therein, and a prefetching means for traversing the linked-data-structure and prefetching data from the nodes in response to a prefetch request from the processor. Generally, the prefetching means includes: (i) means for receiving the prefetch request from the processor, the prefetch request including a starting address of a node, an offset value and a termination value; (ii) means for prefetching data in the node; (iii) means for determining whether a termination condition has been satisfied using the termination value; and (iv) means for loading an address for another node to be prefetched using the offset and the starting address. In one embodiment, the prefetching means includes a plurality of sets of prefetch registers, one set of prefetch registers for each prefetch request from the processor that is yet to be completed. Each set of prefetch registers includes (i) a prefetch address register; (ii) an offset register; (iii) a termination register; (iv) a status register; and (v) a returned data register.

BRIEF DESCRIPTION OF THE DRAWINGS

These and various other features and advantages of the present invention will be apparent upon reading of the following detailed description in conjunction with the accompanying drawings, where.

DESCRIPTION

The present invention is directed to a system and method for prefetching data stored in a pointer linked data structure.

Figure 1:
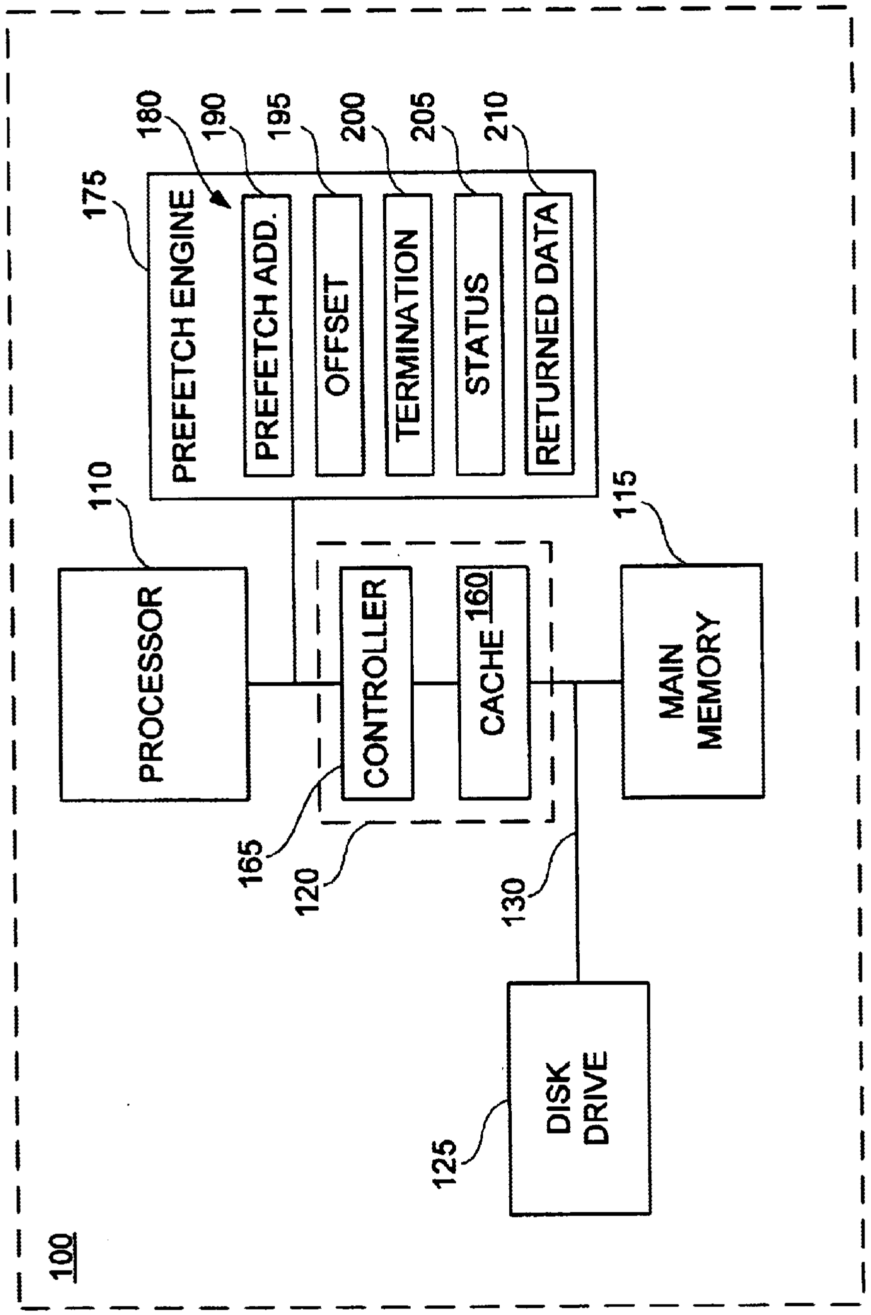
FIG. 1 is a schematic diagram illustrating a computer network for which an embodiment of a method according to the present invention is particularly useful.

FIG. 1 shows a block diagram of an exemplary embodiment of a data processing system with a prefetch engine capable of prefetching data according to an embodiment of the present invention. For purposes of clarity, many of the details of data processing systems 100 that are widely known and are not relevant to the present invention have been omitted. In addition to prefetch engine 105, data processing system 100 typically includes central processing unit (CPU) or processor 110 for executing instructions for a computer application or program (not shown), main-memory 115 for storing data and instructions while running the application, a cache memory system 120 for storing data transferred between the processor and the main-memory, a mass-data-storage device, such as disk drive 125, for a more permanent storage of data and instructions, system bus 130 coupling components of the data processing system, and various input and output devices such as a monitor, keyboard or pointing device (not shown).

Figure 2:
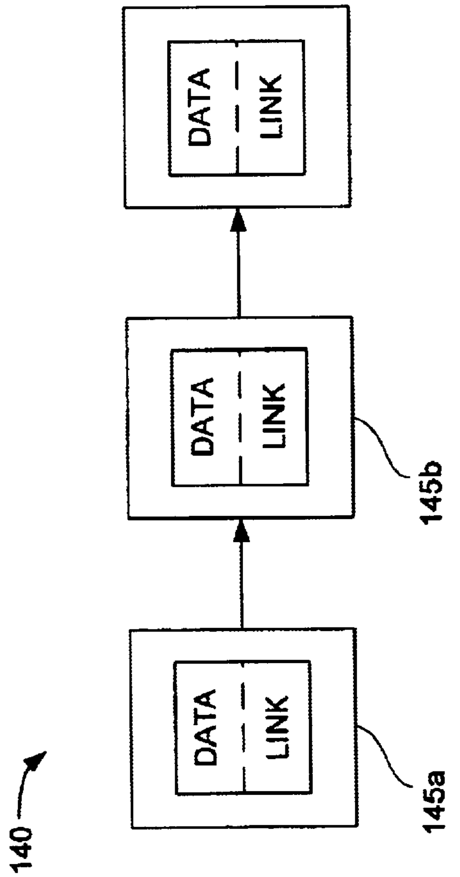
FIG. 2 is a block diagram illustrating a pointer linked data structure having a plurality of nodes with data stored therein.

Main-memory 115 holds information including data and instructions arranged in a data structure. A frequently used type of data structure is a pointer-linked data structure, such as a tree or a list. A block diagram illustrating a pointer linked data structure is shown in FIG. 2. Pointer linked data structure 140 consists of a number of nodes 145 (singularly 145A and 145B) each containing data 150 and a link 155 which is an address, or an offset of specifying a successive node. Unlike an array type data structure successive nodes 145 need not be contiguous, but rather are allocated separately and are widely scattered throughout main-memory 115.

Cache memory system 120 could have a cache memory or cache 160 separate and distinct from processor 110, as shown, or a cache located on the same chip as the processor (not shown). Cache memory system 120 also includes cache controller 165 for controlling operation of cache 160 by controlling mapping of addresses from main-memory 115 to the cache and the replacement of data 150 in the cache in accordance with a cache replacement policy. Although not shown, cache memory system 105 could also have additional, separate caches for instructions and data, which are accessed at the same time, thereby allowing an instruction fetch to overlap with a data read or write.

Figure 3:
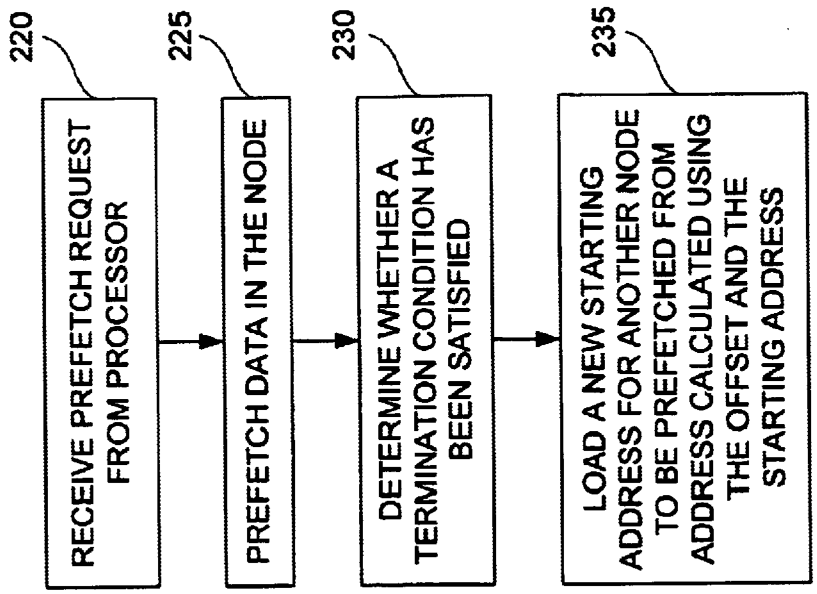
FIG. 3 is a flowchart showing an embodiment of a process for prefetching data in a pointer linked data structure according to an embodiment of the present invention.

In accordance with the present invention, the data processing system 100 also includes a prefetch engine 175. In one embodiment, prefetch engine 175 is an integrated circuit having a processor and an associated memory (not shown) configured to receive a prefetch request from processor 110, prefetch data 150 in a node 145, determine from the data an offset value and calculate from the offset value and the address of the first node 145A the address for a second node 145B to be prefetched. In one embodiment, the prefetch engine 175 includes a plurality of sets of prefetch registers 180, only one of which is shown. The prefetch engine 175 includes one set of prefetch registers 180 for each prefetch request from processor 110 that is yet to be completed. The number of sets of prefetch registers 180 depends on the speed of processor 110 relative to main-memory 115, and the resources, such as power or space, available on the processor to be allocated to the prefetching function. In general, it has been found that from about 2 to about 50 sets of prefetch registers 180 is sufficient. Each set of prefetch registers 180 includes (i) a prefetch address register 190; (ii) an offset register 195; (iii) a termination register 200; (iv) a status register 205; and (v) a returned data register 210. A method for operating data processing system 100 to prefetch data in a pointer linked data structure having a plurality of nodes with data stored therein will now be described with reference to FIG. 3. FIG. 3 is a flowchart showing an embodiment of a process for operating data processing system 100 according to an embodiment of the present invention. In the method, a prefetch request from processor 110 is received in prefetch engine 175 (step 220), and the data in the node prefetched. (step 225) The prefetch request includes a starting address of a node, an offset value and a termination value. The termination value could be either an end address of a last node to be prefetched or a predetermined number of nodes to be prefetched. Generally, the step of prefetching data in the node, (step 225), involves the step of writing data from node 145 to cache 160. This is accomplished by issuing a prefetch instruction to cache controller 165. Next, it is determined whether a termination condition has been satisfied. (step 230) When the termination value is the end address this involves comparing the address of the last node from which data was prefetched to the termination value. When the termination value is a predetermined number of nodes to be prefetched this is accomplished by keeping track of the number of nodes prefetched and comparing the number of nodes prefetched to the termination value. A new starting address for another node to be prefetched is loaded from the prefetched data using the offset and the starting address. (step 235) That is the address indicated by the sum of the starting address and the offset holds the new starting address for the next node to be prefetched. Steps 225 through 235 are repeated until the termination condition is met. Optionally, the process includes the further step (not shown) of keeping track of the status of a prefetch. That is whether data 150 has been returned to returned data register 210 and written to cache 160.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A data processing system comprising:

(a) a processor capable of executing a program;

(b) a main-memory having at least one pointer linked-data-structure; and (c) a prefetch engine configured to prefetch data from a plurality of locations in main-memory in response to a prefetch request from the processor, wherein the prefetch request comprises a starting address of a first node to be prefetched, an offset value and a termination value, wherein the termination value is an end address, and wherein the prefetch engine is configured to compare an address of the last node to be prefetched to the termination value to determine whether the prefetch request has been satisfied.

2. A data processing system according to claim 1, wherein the data in the main-memory comprises at least one pointer linked-data-structure having a plurality of nodes with data stored therein, and wherein the prefetch engine is configured to traverse the at least one pointer linked-data-structure and prefetch data from the nodes.

3. A data processing system according to claim 1, wherein the prefetch engine is configured to determine from data contained in a prefetched first node at the offset value from the address of the first node, an address for a second node to be prefetched.

4. A data processing system comprising:

(a) a processor capable of executing a program;

(b) a main-memory having at least one pointer linked-data-structure; and (c) a prefetch engine configured to prefetch data from a plurality of locations in main-memory in response to a prefetch request from the processor, wherein the prefetch request comprises a starting address of a first node to be prefetched, an offset value and a termination value, wherein the termination value is a number of nodes to be prefetched, and wherein the prefetch engine is configured to count the number of nodes prefetched and compare the number of nodes prefetched to the termination value.

5. A data processing system according to claim 1, wherein the prefetch engine comprises a plurality of sets of prefetch registers, one set of prefetch registers for each prefetch request from the processor that is yet to be completed.

6. A data processing system according to claim 5, wherein each set of prefetch registers comprises a register selected from the group consisting of:

(1) a prefetch address register;

(2) an offset register;

(3) a termination register;

(4) a status register; and (5) a returned data register.

7. A data processing system according to claim 1, further comprising a cache capable of storing data transferred between the processor and a main-memory, and wherein the prefetch engine is configured to write the prefetched data from a node to the cache.

8. A data processing system according to claim 7, further comprising a cache controller configured to store data in the cache, and wherein the prefetch engine is configured to issue a prefetch instruction to the cache controller.

9. In a data processing system, a method of prefetching data in a pointer linked data structure having a plurality of nodes with data stored therein, the method comprising steps of:

(a) receiving in a prefetch engine a prefetch request from a processor, the prefetch request including a starting address of a node, an offset value and a termination value;

(b) prefetching data in the node;

(c) determining whether a termination condition has been satisfied, wherein the termination value is an end address of a last node to be prefetched, and wherein the step of determining whether the termination condition has been satisfied comprises the step of comparing the address of the node from which data was prefetched in step (b) to the termination value; and (d) loading a new starting address for another node to be prefetched from the prefetched data using the offset and the starting address.

10. A method according to claim 9, further comprising the step of repeating steps (b) through (d) until the termination condition is met.

11. A method according to claim 9, wherein the step of prefetching data in the node comprises the step of recording data from the node in a register in the prefetch engine.

12. A method according to claim 9, wherein the data processing system comprises a cache capable of storing data transferred between the processor and a main-memory, and wherein the step of prefetching data in the node comprises the step of writing data from the node to the cache.

13. A method according to claim 12, wherein the data processing system further comprises a cache controller configured to store data in the cache, and wherein the step of prefetching data comprises the step of issuing a prefetch instruction to the cache controller.

14. In a data processing system, a method of prefetching data in a pointer linked data structure having a plurality of nodes with data stored therein, the method comprising steps of:

(a) receiving in a prefetch engine a prefetch request from a processor, the prefetch request including a starting address of a node, an offset value and a termination value;

(b) prefetching data in the node;

(c) determining whether a termination condition has been satisfied, wherein the termination value is a predetermined number of nodes to be prefetched, and wherein the step of determining whether the termination condition has been satisfied comprises the steps of:

(c)(i) counting the number of nodes prefetched, and (c)(ii) comparing the number of nodes prefetched to the termination value; and (d) loading a new starting address for another node to be prefetched from the prefetched data using the offset and the starting address.

15. A data processing system comprising:

(a) a processor capable of executing a program;

(b) a main-memory having a pointer linked-data-structure with a plurality of nodes with data stored therein;

(c) prefetching means for traversing the pointer linked-data-structure and prefetching data from the nodes in response to a prefetch request from the processor; and (d) means for determining whether a termination condition has been satisfied using the termination value, wherein the termination value is compared an address of the last node to be prefetched to determine whether the prefetch request has been satisfied.

16. A data processing system according to claim 15, wherein the prefetching means comprises:

(a) means for receiving the prefetch request from the processor, the prefetch request including a starting address of a node, an offset value and a termination value;

(b) means for prefetching data in the node; and (c) means for loading an address for another node to be prefetched using the offset and the starting address.

17. A data processing system according to claim 15, wherein the prefetching means comprises a plurality of sets of prefetch registers, one set of prefetch registers for each prefetch request from the processor that is yet to be completed, and wherein each set of prefetch registers comprises at least one register selected from the group consisting of:

(1) a prefetch address register;

(2) an offset register;

(3) a termination register;

(4) a status register; and (5) a returned data register.

* * * * *